INVENTOR.
Jon H. Myer

INVENTOR.
Joe H. Myer

Nov. 1, 1966  J. H. MYER  3,282,152
SIGNALMENT RECORDING APPARATUS
Filed April 15, 1964

INVENTOR.
Jon H. Myer

United States Patent Office 3,282,152
Patented Nov. 1, 1966

3,282,152
SIGNALMENT RECORDING APPARATUS
Jon H. Myer, 1906 Beryl Lane, Newport Beach, Calif.
Filed Apr. 15, 1964, Ser. No. 359,985
2 Claims. (Cl. 88—24)

This invention relates to improved apparatus for acquiring, displaying, transmitting and recording the signalment of man. More particularly the invention relates to apparatus utilizing photochemical, photoelectrical, or xerographic means for simultaneously recording the ridge patterns of a plurality of fingers, for example, of an individual either separately or in combination with a facial photograph of the individual.

The idea of recording his unique signalment has occupied man's mind for centuries. The anthropometrical signalment (consisting of exact measurements of height, reach of outstretched arms, length and width of head, etc.), the descriptive signalment (including precise observations of the color of eyes, hair and complexion), and the pathological signalment (localization and description of peculiarities such as deformities, scars, tattoos, etc.,) have been recorded and used for the purpose of identifying the individual.

With the introduction of dactylography or finger-printing and the Henry classification system, a simple and reliable means for establishing and verifying the signalment of an individual was found. The scientific study of skin ridge patterns also known as dermatoglyphics has been extended to cover the skin ridges of other body areas such as palms and feet.

Presently used dactylographic techniques leave much to be desired. In these methods printer's ink is required to be applied to the fingers, palms, or feet from which and imprint is taken by subsequently transferring the ridge patterns by contact printing methods which are subject to many errors and inconveniences.

The contact printing process requires the services of a skilled technician trained in the correct imprinting procedure. To make sure that the ridge pattern is correctly printed, the technician must transfer the critical areas of the body part to a recording medium by contacting the inked body part to that medium and employing a specific rolling motion to avoid smearing of the delicate skin ridge pattern.

In view of these and such other factors as the skills required in the execution of this process, the bodily contact required, the humiliation on the part of the individual involved by being soiled with printer's ink, the problem of printing ink pads acting as transfer agents for disease carriers which is a recognized risk in hospitals where the signalment of new born babies is recorded by foot printing, and the necessity of utilizing special cleaning compounds and tissue, it can readily be seen that established dactylographic techniques have significant disadvantages. Past efforts to acquire fingerprints directly by optical means have been limited to complex cameras utilizing special wide angle lenses and folded light paths. These cameras form a magnified ridge pattern image of one finger on a tilted photographic plate. Their usefulness is restricted to the detailed study of limited singular skin areas.

In my copending application filed December 24, 1962 entitled "A Signalment Recording Apparatus," Serial No. 246,817, I have described methods and apparatus for taking an imprint of a skin area of a body part by pressing such skin area through a suitable coupling medium against the outside of a totally reflecting flat surface of a visually transparent denser medium whereby the total reflection of an illuminant at the surface of the denser medium is frustrated at the points of intimate contact.

The image of the ridge pattern of the skin area thus appears against the light background of the illuminant on the totally reflecting surface. The image thus appearing, however, is not the image of the print but rather the image of the ridge pattern being side-reversed in relation to its imprint. For convenience it is therefore desirable to fold the optical light path in a manner permitting the required additional side reversal in order to obtain print patterns rather than ridge patterns. In my copending invention this image formation and side reversal are performed by a novel element separate and extraneous to the photosensitive recording apparatus which avoids the necessity of employing special, expensive, and non-conventional camera equipment.

When one attempts to simultaneously acquire the ridge patterns of all the fingers of a human hand on a flat surface it becomes apparent that the thumb pad is tilted in relation to the flat surface. This fact is well known and is the cause for the special manipulations required in fingerprinting by the ink method. As a matter of fact in the average adult it is impossible to twist the thumb sufficiently to permit the simultaneous imprinting of all fingers by any method without inflicting pain.

Further investigation of the physiology of the human hand revealed that the capacity of the human thumb of being so moved that its tip can touch the tip of any finger without undue effort (making it apposable), not only is the distinction between man and ape but also permits the acquisition of finger and thumb ridge pattern images by the method of my present invention.

It is therefore an object of this invention to provide improved means and methods for displaying and/or recording the signalment of an individual in an economical and efficient manner.

Another object of this invention is to provide improved means and methods for recording the signalment of an individual which does not require bodily contact with a recording medium such as ink or the like.

Another object of this invention is to provide improved means and methods of identification which are simple and rapid in operation.

Yet another object of this invention is to provide improved means and methods for acquiring, transmitting, displaying, and/or recording the signalment elements of the finger ridge patterns of the thumb and fingers of the human hand simultaneously.

Still another objective of this invention is to provide improved means and methods for the simultaneous acquisition of the multiple print images of the digits of the human hand by means of a grasping motion between the apposable thumb and the fingers.

Another object of this invention is to provide means and methods for acquiring, transmitting, displaying, and/or recording the signalment elements of the finger ridge patterns of the thumb and fingers of the human hand in combination with facial images.

Still another objective of this invention is to acquire and record in an error-free manner ridge patterns of the digits of the human hand in their true positional relationship with each other while also recording the facial image of the individual.

These and other objectives and advantages are realized by my invention which provides a single recording apparatus which utilizes optical means for portraying skin ridge patterns of individuals. A display of both thumb and finger prints is simultaneously obtained by means of a combination of optical elements which utilize the natural positions of the relaxed hand with the thumb apposable to the fingers and permit the acquisition of all the ridge pattern images of a hand from the grasping action of that hand. This combination of optical elements, which shall be called a "ridge pattern block" for the purpose of description, transfers the opposing ridge pattern print image of the thumb and fingers to a common image plane with each other where they may be viewed.

From this plane images can be acquired and transmitted and permanent records made by any of the known optical image recording techniques. Thus conventional photochemical as well as electrostatic and electron beam image recording techniques may be utilized in my invention to permit the acquisition and conservation of such patterns. Conventional, commercially available and inexpensive photographic or photoelectric cameras can be used to record and transmit the ridge pattern and facial images formed by the method of my invention.

These and other features and advantages of the invention will be explained in more detail in the following description taken in conjunction with the accompanying drawings in which.

Figure 1:
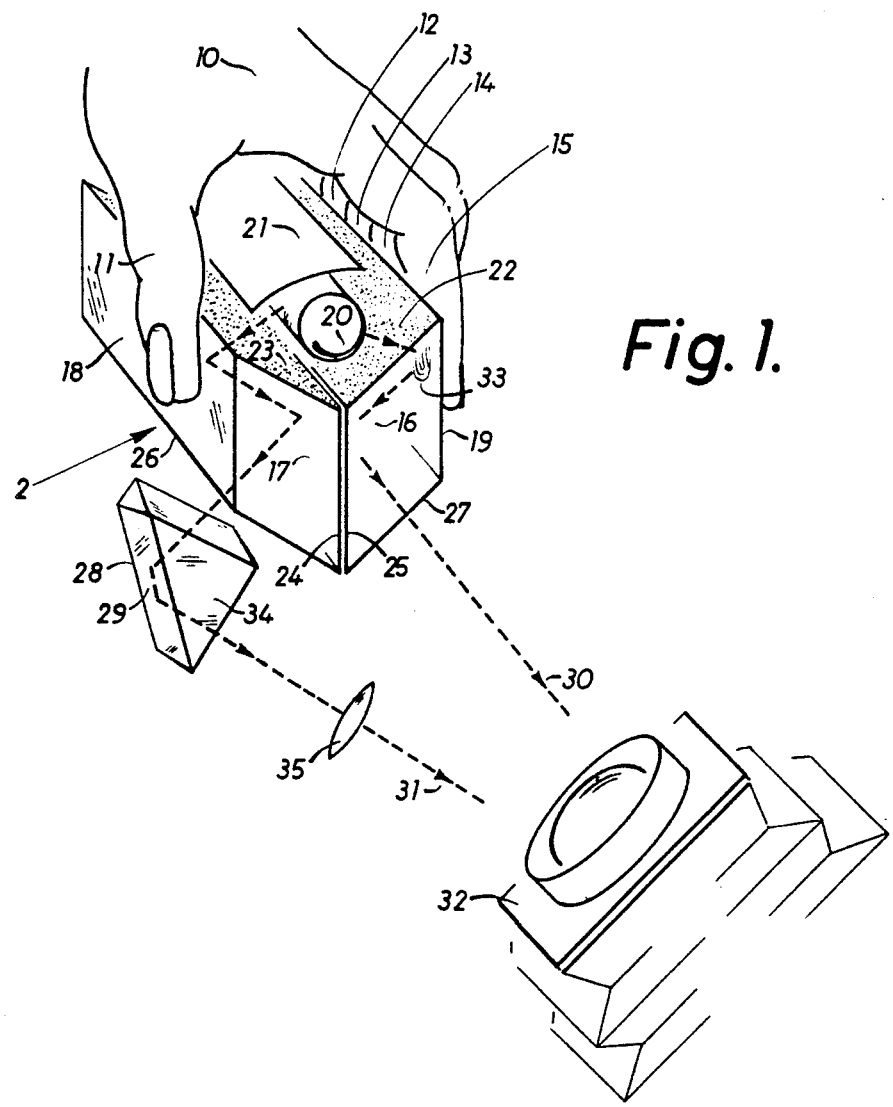
FIGURE 1 is an isometric view of the ridge pattern block of the present invention showing in detail the principle of its operation.

One of the features of my invention is the method of portraying dactylographic finger ridge patterns by a transparent optical element having a totally internally reflecting surface. Total internal reflection occurs when light waves in a denser medium meet a smooth reflecting surface separating the medium from a rarer one in which the wave velocity is greater, provided the angle between the incident beam and the perpendicular of this surface is greater than the critical angle for the color of light used. When total internal reflection occurs in a medium, radiation can penetrate slightly beyond the reflecting surface into a rarer medium. Such penetration depends upon the wavelength of the radiation, its angle of incidence, and the ratio of the refractive indices between the two media. This phenomenon of penetration can be utilized to frustrate the total reflection of an illuminant completely at those points of intimate contact where an external body is brought into close proximity and coupled with the totally internally reflecting surface from the side of the rarer medium. At such points of contact the radiation will penetrate into the contacting opaque body where it is trapped and absorbed. In this manner total reflection is frustrated at the points of contact forming a dark image of the points of contact against the background of the illuminant which is totally reflected. In this invention coupling between the finger of the person being fingerprinted according to the present invention and the optical element may be provided by intimate contact and by naturally occurring moisture and/or oils of the finger. In some instances it may also be desirable to apply an oily substance such as lanolin or glycerine to enhance the coupling action. Particularly, individuals with naturally dry skin or pathological conditions such as ichthyosis require the application of such a coupling medium.

As shown by Snell an analysis of the phenomenon of total reflection reveals that the sine of the critical angle (the minimal angle at which total internal reflection occurs in the dense medium) is equal to the ratio of the refractive indices of the less refractive rarer medium air to the more refractive dense medium glass. Glasses range in refractive index from 1.5 (ratio 0.668, critical angle 42 degrees) for the lightest crown glasses, to 1.9 (ratio 0.527, critical angle 32 degrees) for the heaviest flint. In order for a ray which is normally incident onto the front surface of a transparent optical element to be totally internally reflected by the back surface of said element, the front and back surfaces of said element must include an angle at least equal to the critical angle for said medium. The resulting oblique angles of viewing may cause a foreshortening of the print image which ranges from .67 for the lightest crown glass to .85 for the heaviest flint. Hence, in order to obtain minimum foreshortening, it is preferred to use a glass having as high a refractive index as possible. In my invention the phenomenon of frustration of total internal reflection is utilized in optical elements to acquire the ridge pattern images of the digits of a hand. These elements which henceforth shall be called thumb prism and finger prism respectively combine to form the ridge pattern block of my invention. The ridge pattern images formed by the ridge pattern block and the facial image are combined by the objective lens of a camera which records the images. Various established recording techniques can be used for this purpose: photochemical techniques in which a photographic emulsion is exposed forming an invisible latent image in the suspended minute silver halide crystals which is subsequently chemically developed into a visible silver deposit image; xerographic techniques in which an electrostatically charged plate forms an invisible latent image which is developed by dusting; photoelectric techniques in which a photocathode emits electrons in response to exposure by the image whereby an electrical signal representative of the visual image is obtained for transmission, for example.

Referring now to FIGURE 1, this ridge pattern block 2 comprises two elongated rhombohedral prisms 17 and 16 hereinafter called the thumb and finger prisms, which are clamped or cemented to each other at the surfaces 24 and 25 forming a symmetrically shaped optical structure whose section is in the shape of a tail of an arrow. Surfaces 22 and 23 of this assembly form a trough on one side bisected by the symmetry plane at which the two prisms are joined, and on the other side form a blunt wedge shaped projection bisected by the symmetry plane. The secondary reflecting surfaces 24 and 25 between the two rhombohedral prisms are polished and silvered mirrored surfaces providing total internal reflection. The surfaces 22 and 23 of the two rhombohedra forming the trough are abraded or etched to provide a matte surface while the remaining surfaces are polished and clear. A light source 20 is installed in the trough formed by the two matte surfaces and illuminates these surfaces. The hand 10 to be recorded grasps the two rhombohedral prisms 16 and 17 comprising the ridge pattern block 2 at the large approximately parallel outside surfaces 18 and 19 and frustrates the reflection of the light issuing from the matte surfaces 22 and 23 at the points of ridge contact. Frustration of total reflection occurs through trapped light at the points of ridge contact and forms a dark ridge pattern image against the background illumination issuing from the matte surfaces. This frustration occurs in both the thumb prism 17 and the finger prism 16 and forms ridge pattern images facing each other. It is the function of the previously described silvered surfaces 24 and 25 which are adjacent to the plane of symmetry between the thumb prism and finger prism of the ridge pattern block 2 to extract these images from between the digits of the hand simultaneously side reversing the ridge pattern images into true print images. Since the light paths of the ridge patterns issuing from the thumb prisms and the light paths of the ridge patterns issuing from the finger prism are divergent, additional means should be provided to deflect these light paths to an approximately parallel mode if their acquisition on a common image plane is desired. This is accomplished by means of two additional reflections in either light path issuing from the thumb or finger prism. Due to the smaller image of the single thumb pattern it is preferred to insert this double reflection into the thumb light path. As shown, the double reflection is provided by an Amici prism 34 but alternate means such as two 90° prisms, or two mirrors could be utilized. Any subsequent manipulations of the light paths of the thumb and the fingers must conserve the evenness or oddness of the number of reflections in these light paths. However, the final image of all the fingers recorded should be side reversed if a true print record is desired. The ridge pattern print images formed by the ridge pattern block 2 are acquired by the recording or transmitting camera 32 where they can be combined with facial images and/or recorded data.

In practice, the hand 10 grasps the ridge pattern block 2 comprising the rhombohedral prisms 16 and 17 between the thumb 11 and the fingers 12, 13, 14, 15. The image of the ridge pattern of thumb 11 is formed on prism 17 at the totally internally reflecting surface 18 while the image of the ridge pattern 33 of the index finger 15 is formed on prism 16 at the totally internally reflecting surface 19. The ridge pattern images of the other three fingers 12, 13 and 14 are similarly formed on surface 19. The tubular flash or floodlight source 20 with its reflector 21 illuminates the matte surfaces 22 and 23 which act as a diffuse illuminant back ground for the ridge pattern images formed at surfaces 18 and 19 by frustrating the total reflection of these surfaces at the points of finger ridge contact. Tracing, for example, the complete light path 30 through the process of forming the ridge pattern image of index finger 15 we find that the light from source 20 and reflector 21 illuminates the diffusing surface 22 which provides a bright, evenly illuminated background for the index finger ridge pattern formed on the surface 19 of prism 16 at the area of pressure contact 33. This image which is a finger ridge image is now side reversed into a print image by internal reflection at the silvered surface 25 and leaves through surface 27 to be observed or recorded by lens system 32. In a similar manner the light path 31 can be traced through the process of forming the ridge pattern image of thumb 11. Here again the light originating at the source 20 and the reflector 21 is diffused at the matte surface 23 providing the bright background for the image of the thumb ridge pattern formed at surface 18. Side reversal occurs at the silvered surface 24 and the image leaves prism 17 through surface 26. In order to retain this side reversal while deflecting the image light path 31 to make it approximately parallel to the light paths of the opposing fingers 12, 13, 14, 15 such as path 30, it is necessary to pass light path 31 through a double reflection such as occurs in the Amici prism 34. This prism reflects the image internally twice at the roof surfaces 28 and 29. The opposing finger ridge print patterns which leave at a diverging angle from the surfaces 26 and 27 are thus placed in juxtaposition by means of the Amici prism 34 and can be simultaneously or sequentially acquired by the observation, recording or transmitting apparatus 32. The lens system 35 serves to compensate for the difference in light path length between the thumb light path 31 and the forefinger light path 30. The combination of light paths 30 and 31 for one hand is represented in FIGURE 3 by light path 47 for the right hand and light path 48 for the left hand.

Figure 2:
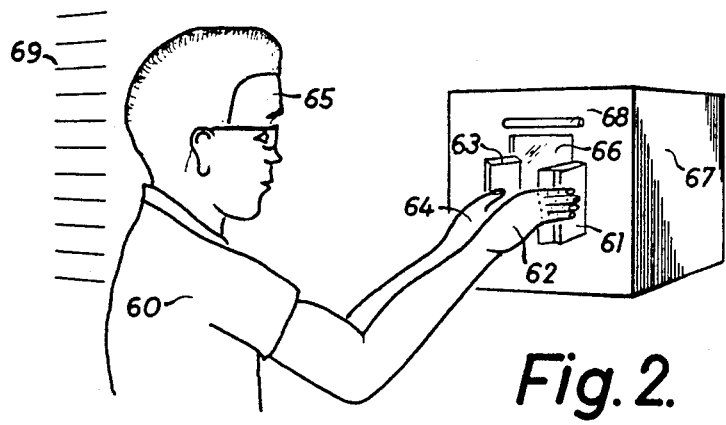
FIGURE 2 is an isometric view of apparatus illustrating the operating principle and method of the present invention.
Figure 3:
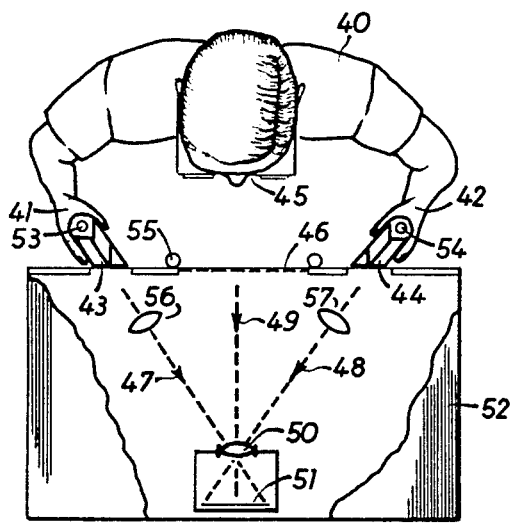
FIGURE 3 is a plan of apparatus further illustrating the principle of the invention.

Referring now to FIGURES 2 and 3, a further embodiment of the present invention is shown whereby the complete signalment of an individual may be acquired through three main optical paths consisting of the facial image light path, the right hand image light path and the left hand image light path. Each of the hand image light paths transmits the combined ridge pattern images of all the digits of a hand which are displayed on a common image plane by means of the optical elements of the ridge pattern block.

In FIGURE 2 the individual 60 whose signalment is being acquired by the method and with the apparatus of this invention grasps the right ridge pattern block 61 with his right hand 62 and the left ridge pattern block 63 with the left hand 64 simultaneously the facial image 65 of the individual 60 is reflected on the partially reflecting glass 66 covering an aperture on the enclosure 67. Within this enclosure but not shown in this illustration are the optical acquisition and recording means. This apparatus performs the following operations: It permits the individual 60 to view the reflection of his own image in the partially reflecting glass 66 and adjust his position or features to guarantee an optimum image. It permits the optical sensors within the enclosure to acquire and record this facial image and body height on scale 69 through the glass 66 with the aid of supplementary illumination 68 while at the same time acquiring and recording the finger ridge patterns of all fingers formed on the ridge pattern blocks 61 and 63.

FIGURE 3 shows a top view of the apparatus and method of this invention. The individual 40 grasps the right ridge pattern block 43 with his right hand 41. This block assembles the ridge pattern images of all the right hand fingers into a common right hand ridge pattern image light path 47. Similarly the left ridge pattern block 44 grasped by the left hand 42 assembles the ridge pattern images of all the left hand fingers into a common left hand ridge pattern image light path 48. Enclosure 52 has been partially cut to clarify this illustration. It contains the lens system 50 and the photochemical, photoelectrical or xerographic recording or transmitting means 51. The lens system 50 further combines the ridge pattern image paths of the two hands 47 and 48 with the facial image light path 49. It is advisable to keep light path 49 at least 5 feet long to avoid undue distortion of the facial image. Lenses 56 and 57 compensate for the differences in distance between the ridge pattern blocks 43 and 44 and lens system 50 and the face 45 and lens system 50 respectively. Supplementary illumination is provided by the ridge pattern block lights 53 and 54 which illuminate the ridge pattern background and supplement the facial illumination from light source 55 with scattered light escaping from the sides of the blocks 43 and 44.

Figure 4:
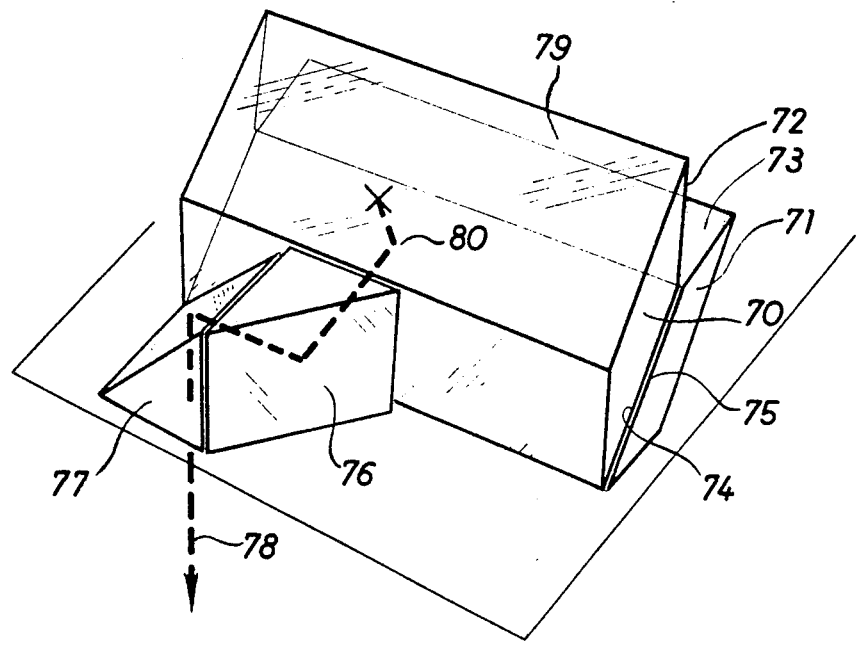
FIGURE 4 is an isometric view of another embodiment of the invention.

In FIGURE 4 an alternate configuration of a ridge pattern block is shown. The two rhombohedral prisms 70 and 71 which are clamped together at their silvered surfaces 74 and 75 and with their top surfaces 72 and 73 etched to a matte finish to diffuse the light of the illuminating source which is not illustrated for purposes of clarity. In this illustration prism 70 is the thumb prism and the two 90° prisms 76 and 77 provide the double reflection required to maintain the correct number of side reversals for the thumb image. Tracing the thumb image light path 78 from the point of pressure contact at point X on surface 79 the first internal reflection and side reversal occurs at point 80 on surface 74. From there the image is projected into the attached prism 76 on whose silvered hypotenuse the second internal reflection and side reversal occurs. The image travels further into prism 77 on whose silvered hypotenuse the third internal reflection and side reversal occurs. By means of this arrangement a triple side reversal is obtained which (just like the single side reversal occurring in prism 71 on surface 75) turns the ridge pattern image into a print image. Simultaneously the thumb image is turned to a common plane with the images of the other fingers and a lateral displacement is obtained.

There thus has been disclosed a simple, reliable method and apparatus for recording the distinct signalment of an individual.

What is claimed is:

1. Optical apparatus for simultaneously forming on a common plane an image of the skin ridge patterns of apposable digits of a hand comprising, in combination, a pair of prisms each having at least two parallel surfaces one of which exhibits total internal reflection, the other being such as to form an image by frustration of the total internal reflection at the points of contact of said digits, said prisms being juxtaposed at the totally internal reflecting ones of said parallel surfaces, means for illuminating the image forming internal reflecting surfaces of said prisms and means to direct reflected images from said internal reflecting surfaces in substantially parallel paths to said common plane.

2. The invention according to claim 1 wherein the surfaces extending between said parallel surfaces of said juxtaposed prisms form a trough in which said illuminating means is disposed.

References Cited by the Examiner

UNITED STATES PATENTS

| | | | |
|---|---|---|---|
| 2,530,758 | 11/1950 | Cirone | 88—24 |
| 2,579,961 | 12/1951 | Popma | 88—24 |
| 3,083,624 | 4/1963 | Troup | 95—4.5 |
| 3,195,430 | 7/1965 | Young | 95—1.7 |

FOREIGN PATENTS 432,240   7/1926   Germany.

JOHN M. HORAN, *Primary Examiner.*